United States Patent
Graham (10) Patent No.: US 6,754,557 B2
(45) Date of Patent: Jun. 22, 2004

(54) SYSTEM AND METHOD FOR MANUFACTURING PLASTIC INJECTION STACK COMPONENTS

(75) Inventor: Len Graham, Cave Creek, AZ (US)

(73) Assignee: The Tech Group, Scottsdale, AZ (US)

(*) Notice: Subject to any disclaimer, the term of this patent is extended or adjusted under 35 U.S.C. 154(b) by 387 days.

(21) Appl. No.: 09/957,180

(22) Filed: Sep. 20, 2001

(65) Prior Publication Data

US 2003/0055525 A1 Mar. 20, 2003

(51) Int. Cl.[7] .................. B29C 45/00; G06F 19/00
(52) U.S. Cl. .............. 700/200; 700/162; 700/197; 219/69.11
(58) Field of Search ................ 700/162, 197, 700/200, 112, 114, 115, 213, 214, 215, 217, 218, 174, 117; 483/1, 15, 49; 219/69.11, 69.12, 69.15, 69.17

(56) References Cited

U.S. PATENT DOCUMENTS

| | | | | |
|---|---|---|---|---|
| 4,845,835 A | * | 7/1989 | Schneider | 483/49 |
| 5,242,359 A | * | 9/1993 | Obrist | 483/15 |
| 5,530,217 A | * | 6/1996 | Knecht | 219/69.11 |
| 6,314,336 B1 | * | 11/2001 | Sugiyama et al. | 700/174 |

FOREIGN PATENT DOCUMENTS

JP          7-68423    * 3/1995

* cited by examiner

Primary Examiner—Leo Picard
Assistant Examiner—Steven R. Garland
(74) Attorney, Agent, or Firm—Snell & Wilmer L.L.P.

(57) ABSTRACT

The present invention generally relates to a system and method for manufacturing plastic injection mold cavity components. More specifically, the present invention provides an integrated system and method for manufacturing plastic injection mold cavity components, which integrates manufacturing between two or more subcells. In one embodiment of the invention, a supercell system integrates two or more subcells, in which component workpieces and electrodes are machined. A supercell may include a computerized master control unit, configured to monitor and provide instructions for a master robot that delivers and retrieves workpieces and electrodes to two or more subcells. Thus, two or more subcells may be integrated by the master control unit, the master robot, a track or path that the master robot follows, identification indicia attached to workpieces and electrodes, a combination thereof or any other components of supercell that may suitably integrate two or more subcells.

37 Claims, 5 Drawing Sheets

SYSTEM AND METHOD FOR MANUFACTURING PLASTIC INJECTION STACK COMPONENTS

TECHNICAL FIELD

The present invention generally relates to systems and methods for manufacturing mold components. More specifically, the present invention provides an integrated system and method for manufacturing plastic injection mold cavity stack components.

BACKGROUND ART AND TECHNICAL PROBLEMS

Plastics are used to make countless different goods, from pen caps, to coffee makers, to automotive heating and cooling systems. To manufacture such a wide variety of plastic articles in large quantities with precision, many manufacturing processes have been developed. For example, plastic part manufacturers have developed plastic injection molding, compression molding, vacuum forming, casting, extrusion, rotational molding, blow molding and injection stretch-blow molding to make parts. All of these processes have one common feature—the use of a mold.

Generally, a mold is a containment device whose internal cavity replicates the shape of a part to be manufactured. Ideally, a mold allows a manufacturer to produce anywhere from one to millions of a given part, each part being essentially identical to every other part made with that mold. Also ideally, the process used to make a plastic part reduces the amount of labor required to produce the final product and is the most cost effective process available for production of that product When deciding which of the above processes to use, and the type of mold to use, a manufacturer must weigh the often conflicting goals of cost reduction, high output and precision For manufacturers who specialize in the production of "low-precision" parts, such as inexpensive disposable pen caps, low cost and high output may be important considerations. Some plastic parts manufacturers, however, specialize in the production of extremely precise, high-end plastic parts, such as those that might be used in the medical industry. For those manufacturers, a high level of precision is an important requirement. However, even a manufacturer for whom a high level of precision is the ultimate goal hopes to achieve that goal while minimizing production costs and maximizing efficiency and output.

Plastic injection molding is often a desirable technique for making plastic parts because it can typically produce very precise parts at high volumes, for a low cost per item Basically, plastic injection molding involves designing and building a mold, injecting molten plastic into the cavity of the mold, allowing the plastic to harden into the plastic part being made and ejecting the plastic part from the mold. One disadvantage of plastic injection molding is the high front-end cost of making the plastic injection mold required for the process.

Figure 4A:
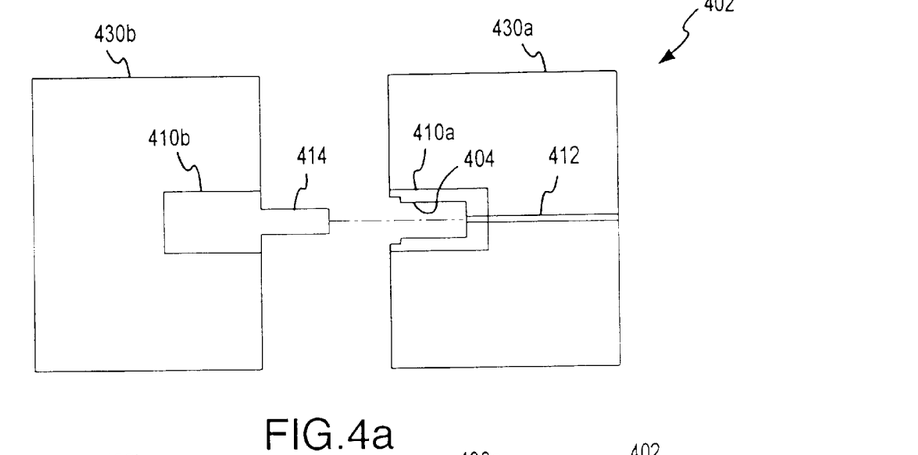
FIGS. 4a–c are conceptual diagrams of a plastic injection mold and a process for making a plastic part with the mold.
Figure 4B:
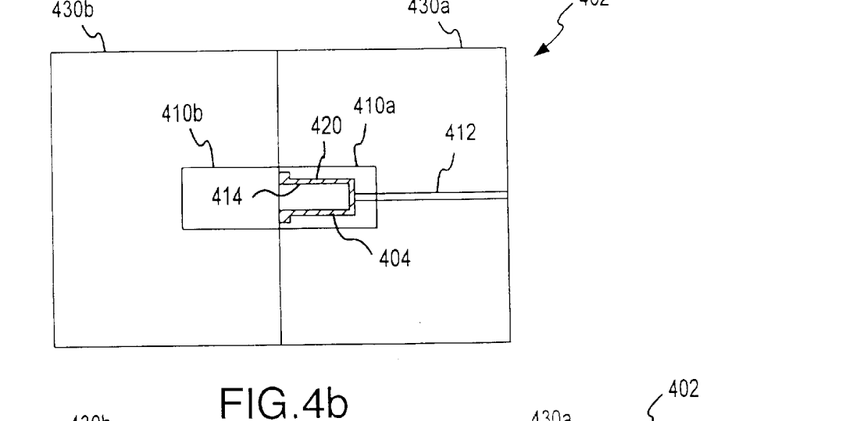
Figure 4C:
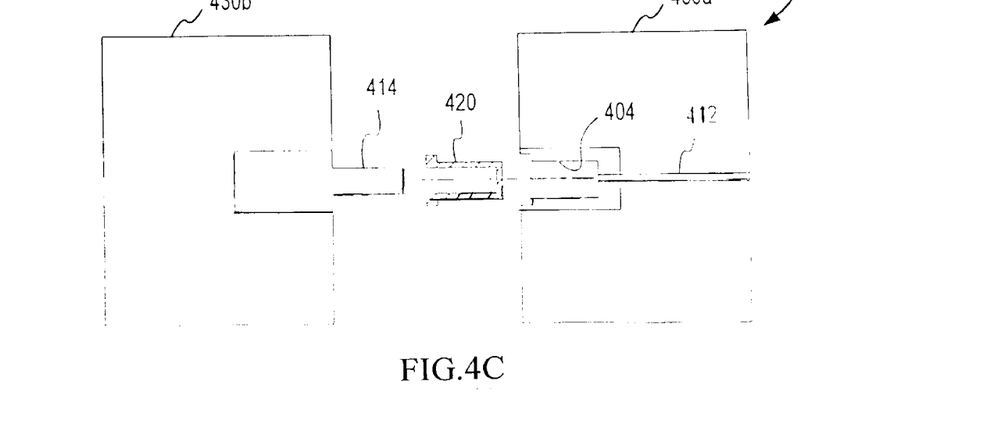

FIGS. 4*a–c*, in the accompanying drawing figures, illustrate a simplified representation of a standard mold for plastic injection molding and a simple plastic piece made with the mold. Typically, a plastic injection mold consists of a mold base 430 and a "mold cavity stack assembly" 410. As described in further detail in the Detailed Description below, a mold base 430 is the unit which retains, aligns and supports the mold cavity stack assembly 410 and is typically a fairly standardized component of a plastic injection mold. A mold cavity stack assembly 410, however, is almost always customized to at least some extent. It is the part of the mold into which molten plastic is injected and, thus, is the part of the mold that is custom designed and made for the manufacture of a specific part.

The mold cavity stack assembly 410 typically has two halves—an A side 410*a*, which includes one or more cavities 404, and a B side 410*b*, which includes one or more cores 414. A cavity 404 defines the outer shape of a feature of a plastic piece, while a core 414 defines the inner shape of the piece In FIG. 4*a*, the mold base 430 and mold cavity stack assembly 410 are shown spaced apart. FIG. 4*b* shows the mold base 430 and mold cavity stack assembly 410 in a mated configuration, with the plastic piece 420 formed by injecting molten plastic through an injection channel 412 (such as a heated sprue bushing) into the space created between the cavity 404 and the core 414. FIG. 4*c* shows the mold base 430 and mold cavity stack assembly 410 apart again, with the plastic piece 420 separated from the mold.

The mold cavity stack assembly 410 is typically made by designing and manufacturing individual components, usually from metal, ceramic and/or other heat-treated materials, and configuring these components together within the mold base 430 to form the cavity stack assembly 410. Although the cavity stack assembly 410 in FIG. 4 is relatively simplistic, other cavity stack assemblies may be very complex, involving multiple component parts to make up the cavity 404 and the core 414. For example, a cavity stack assembly 410 may be designed to make an intrinsically complex part, multiple copies of the same part, or different parts. In general, and for purposes of this specification, the phrase "cavity stack components" means component parts used to construct a mold cavity stack assembly 410.

Before a mold cavity stack is actually produced, it must be designed. This process starts when a parts order arrives at a plastic parts manufacturing company. The parts order may include partial or complete drawings of the part to be manufactured and/or a solid model of the part. If appropriate, a parts manufacturer may use drawings and specifications to create a three dimensional model of the part. For example, Unigraphics (Cypress, Calif.) provides software systems for digital solid model data sharing, such as its MoldWizard system, including mechanical computer assisted design ("MCAD") software for producing three dimensional models for mold making.

After a plastic part to be manufactured has been thoroughly studied and modeled, it is typically the job of a mold designer to design the mold itself The designer may take dozens of hours or more to construct a preliminary mold design, often with the help of a computer assisted design ("CAD") system. A plastic parts manufacturer may then require that the preliminary mold design be approved by one or more people other than the designer. For example, the preliminary design might require approval by a team of engineers or other mold designers, as well as one or more persons in charge of "tooling" the mold—i.e., machining raw "workpieces" of metal into finished mold cavity components (described further below). A designer may then have to change a design to receive the approval of the other members of the design team. Thus, the preliminary design of a mold typically changes with input from various members of the design team and with subsequent adjustments by the designer.

Figure 5A:
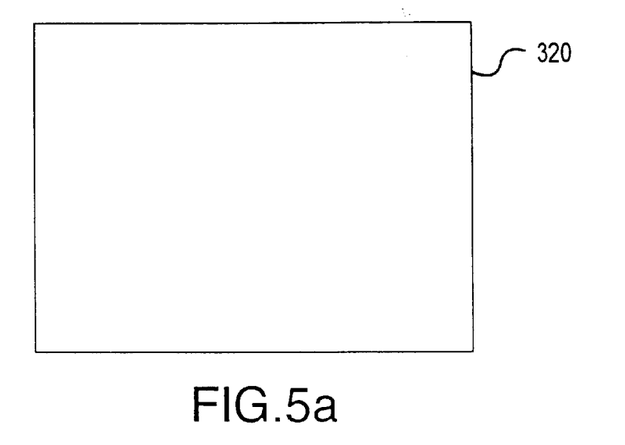
FIGS. 5a–c are conceptual diagrams of a process for making a plastic injection mold cavity stack component from a raw workpiece
Figure 5B:
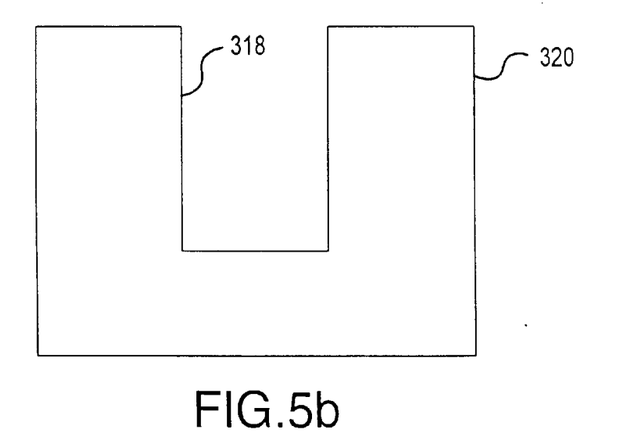
Figure 5C:
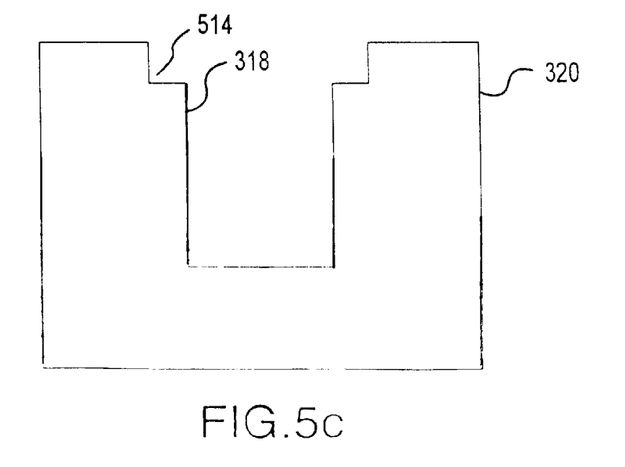

After the a mold is designed on paper, it must be constructed. The job of creating an actual mold from a design is often the job of a "master mold maker." A master mold maker typically has many years of experience and training in mold making and is the person, mentioned briefly above, who decides how to best machine raw workpieces into finished mold cavity stack components. Often, a master mold maker begins to make a mold cavity stack assembly from a design and then, as the cavity stack is being assembled, makes adjustments to the design to make the mold configuration more effective. Master mold makers typically understand the intricacies of mold making to such an extent that they can anticipate engineering, manufacturing and performance problems, oftentimes before the mold is even fully constructed FIG. 5, in the accompanying drawing figures, shows how one, very simple cavity stack component may be machine-tooled The component resembles the A side of the cavity stack assembly 410a pictured in FIG. 4, which was used to make a pill bottle. FIG. 5a simply depicts a raw workpiece 320, which may be a block or piece of metal or other suitable material. FIG. 5b shows the workpiece 320 with a cavity 318 that has been milled, drilled or otherwise machined into its surface. FIG. 5c shows the workpiece 320 after an additional feature 514 has been machined into its surface. Typically, the cavity 318 and the additional feature 514 may be added to the workpiece 320 by two different machines, in two different stages. Though the tooling of workpieces is often far more complex than the process depicted in FIG. 5, that figure depicts the general process by which a mold cavity stack component is typically constructed—i.e., machining a raw workpiece, in a step-wise fashion, to render a finished cavity stack component. The job of the master mold maker is to use a mold design to decide how to best construct each cavity stack component in this manner.

Although master mold makers are typically highly skilled technicians, one problem with prior art systems for making molds is that they rely heavily on input from the master mold maker at multiple stages of mold production. However, two mold makers, independently looking at the same design for the same part, may make molds that are very slightly different from each other. Each mold may produce plastic parts that work equally well, but the parts made from one mold may not be identical to the parts made from the other mold. Thus, the parts may not be interchangeable For example, consider a simple example, with reference to FIG. 4. Suppose the plastic part made by the mold shown in FIG. 4 is a child-proof pill bottle Frequently, such a plastic part will be designed with measurements having a margin for error of 0.002 inches. For various reasons, such as the operating parameters of certain tooling machines or the characteristics of materials being used, one master mold maker may find it advantageous to construct the mold so that the outer diameter of the top of the pill bottle is at the high end of the margin for error—i.e., +0.002 inches. Another master mold maker may choose the low end of the margin for error—i.e., -0.002 inches. Either of those master mold makers will then make molds for the bottle tops such that the resulting bottle tops will fit on their associated pill bottles. However, the bottles and tops made by one mold maker will have slightly different dimensions than the bottles and tops made by the other mold maker and, thus, may not be interchangeable.

Even if the two master mold makers in the above example begin with a plan to make their bottles and tops of the exact same dimensions, one of the two may decide to change the dimensions slightly during the production process. In fact, it is very common in prior art methods for master mold makers to "tweak" or adjust the design of mold cavity stack components during production, to achieve a particular goal, for example to make the components fit together better or to fix a defect noticed during production. Thus, even if two mold makers start out to build exactly the same mold components, they may end up with two different mold cavity stack assemblies.

The involvement of the master mold maker in prior art systems and methods for making plastic injection mold cavity stack components, described above, often introduces inefficiencies. For example, there is the case of a plastic parts manufacturer with multiple production facilities who wishes to produce the same set of plastic parts at several or all of those facilities. The manufacturer is likely to have a different master mold maker at each facility. Even if each of those mold makers looks at the same sets of designs for one particular cavity stack assembly, each may devise a slightly different way to make the assembly or may slightly alter the design during the production process, as described above Thus, parts made at one facility may not identically match parts made at another facility and may not be interchangeable. As in the example outlined above, bottle tops from one plant may not fit on bottles from another. This limits the ability of the manufacturer to produce and distribute identical, interchangeable parts from all of its production facilities.

As discussed briefly above, once a mold design is complete, the construction of the mold itself typically involves machine-tooling workpieces in multiple stages, to produce finished mold cavity stack components. Machines for tooling workpieces include machining centers, turning centers, various grinders, die-sinking and wire-cut electrode discharge machining apparatuses ("EDMs") or any other suitable machines for machining a workpiece to produce a mold cavity component. EDMs, like machining centers or other tooling machines, carve features into a workpiece to produce a mold component. An EDM positions a workpiece and electrode within a gap of positive and negative current, typically within a medium of dielectric fluid, and then uses a generated electric discharge to machine a feature into a workpiece. When an EDM is used, the electrodes used to form a particular feature in a mold component must also be produced. Thus, a typical method for producing mold components also involves the production of electrodes for EDMs. In fact, electrodes used to manufacture a given mold component are often made during the same cycle of production as the components produced by the electrodes.

Current systems provide partially integrated cavity stack component manufacturing, in that they provide integration between two or three machines for machining a workpiece. A typical subsystem within a cavity stack component manufacturing facility includes a staging area (where workpieces and/or electrodes are held before and after machining) positioned adjacent to a robot, which in turn is positioned directly adjacent to one or two machines. After the staging area is loaded manually with workpieces and/or unfinished electrodes, the robot transfers the workpieces and/or unfinished electrodes, one at a time, from the staging onto a machine After a machine has cut or otherwise tooled a workpiece or electrode, the adjacent robot can then retrieve the workpiece or electrode and place it back onto the staging area or onto another machine. The workings of such a system, including the operation of the two machines and of the robot, are typically controlled by a computer system.

Though current systems provide partial integration, as just described, they do not provide integration between two or more subsystems. Thus, workpieces and electrodes are typically manually transferred from one subsystem to another until they are finished. This current state of the art is inherently inefficient, in that workers must be on site to transfer workpieces and electrodes between subsystems. Thus, a manufacturer must typically have multiple workers on site and cannot, for example, leave a manufacturing facility largely unattended overnight, allowing the machines to produce components with perhaps only one overseer.

Thus, a need exists for a system and method for manufacturing mold cavity stack components that integrates multiple subsystems of machines, robots and staging areas. Such a system and method would allow a mold manufacturer to operate a facility with little human input, once the production process is started. A need also exists for a system and method for manufacturing cavity stack components that includes one or more sets of guidelines for master mold makers to follow, so that more precise, consistent cavity stack components may be produced. Such systems and methods would enhance the production of mold cavity stack components, and thus plastic injected parts, leading to decreased labor and production costs and increased efficiency.

SUMMARY OF THE INVENTION

The present invention provides systems and methods for manufacturing plastic injection mold cavity stack components which overcome the shortcomings of the prior art More particularly., in accordance with one embodiment of the present invention, a system integrates at least two subcells, each of which includes a subcell cabinet, at least one machine, a subcell robot and a subcell control unit. According to various aspects of the invention, the system may integrate two or more subcells by means of a master robot, a master control unit, a track (defined by the path traveled by the master robot), identifying indicia on workpieces and electrodes, or any other suitable mechanism or steps for more efficiently coordinating two or more subcells in the manufacturing process.

In one embodiment of the invention, a master robot loads raw workpieces onto a master cabinet. The master robot, working in conjunction with the master cabinet, moves along its track, retrieving workpieces from the master cabinet and placing them on subcell cabinets and retrieving workpieces from subcell cabinets and placing them on the master cabinet. Meanwhile, subcell robots retrieve workpieces from subcell cabinets and place them on machines. When machining of a particular workpiece is complete on a particular machine, a subcell robot retrieves the workpiece from that machine and places it back on the subcell cabinet within its subcell or onto another machine within its subcell. When a workpiece has been fully machined within one subcell, the master robot retrieves the component from the subcell cabinet and delivers it to another subcell, to the master cabinet or to another cabinet that contains finished workpieces.

In accordance with another aspect of the invention, the process of designing mold cavity stack components and implementing designs into actual instructions for machining the components includes one or more sets of rules or guidelines. For example, in one embodiment a system includes a library of permissible designs for those features of components that recur frequently in mold cavity stack production. Thus, a master mold maker selects from the library of pre-approved designs when designing a component thereby reducing the variation of components between mold makers This and other similar systems provide substantially fully engineered parts during the design phase, which are designed to be identical from mold maker to mold maker and which do not require further human design input once production has started.

The system and method of the present invention are capable of substantial, if not complete, integration. According to one embodiment, workpieces and/or other aspects of components are chosen from libraries and are placed within a system of cavity stack component production that integrates multiple subcells. A fully integrated system and method for manufacturing plastic injection mold cavity stack components may enable a manufacturing facility to run continuously, once programmed, with little or no human input.

BRIEF DESCRIPTION OF THE DRAWING FIGURES

Additional aspects of the present invention will become evident upon reviewing the non-limiting embodiments described in the specification and the claims taken in conjunction with the accompanying drawing figures, wherein like reference numerals denote like elements, and:

DETAILED DESCRIPTION

The following specification describes, in detail, exemplary embodiments of an integrated system for manufacturing plastic injection mold cavity stack components. The description is of exemplary embodiments of the invention only, and is not intended to limit the scope, applicability or configuration of the invention in any way. Rather, the following description is intended to provide convenient illustrations for implementing various embodiments of the invention. As will become apparent, various changes may be made in the function and arrangement of the elements described in these embodiments without departing from the spirit and scope of the invention.

As background, FIGS. 4a–c in the accompanying drawing figures show a simplified, cross-sectional representation of a standard mold 402 for plastic injection molding and a simple plastic piece 420 made with the mold 402. Typically, plastic injection mold 402 consists of a mold base 430 and a "mold cavity stack assembly" 410. Mold base 430 typically retains, aligns and supports mold cavity stack assembly 410 and is typically a fairly standardized component of plastic injection mold 402 Mold cavity stack assembly 410, however, is almost always customized. It is the part of mold 402 into which molten plastic is injected and, thus, is the part of the mold that is custom designed and made for the manufacture of a specific plastic part.

Mold base 430 and mold cavity stack assembly 410 typically comprise two halves—an A side 430a/410a, which includes one or more cavities. 404, and a B side 430b/410b, which includes one or more cores 414. Cavity 404 defines the outer shape of plastic piece 420 while core 414 defines the inner shape of plastic piece 420. In FIG. 4a, mold base 430 and mold cavity stack assembly 410 are shown spaced apart. In FIG. 4b, mold base 430 and mold cavity stack assembly 410 are united, with plastic piece 420 formed by injecting molten plastic through an injection channel 412 into the space created cavity 404 and core 414 FIG. 4c shows the mold base 430 and mold cavity stack assembly 410 apart again, with the plastic piece 420 removed from the mold The mold cavity stack assembly 410 is typically made by designing and manufacturing individual components, usually from metal, ceramic and/or other heat-conductive materials, and configuring these components together within the mold base 430 to form the cavity stack assembly 410. Although the cavity stack assembly 410 in FIG. 4 is mechanically simplistic, other cavity stack assemblies may be very complex, involving multiple component parts to make up the cavity 404 and the core 414. For example, a cavity stack assembly 410 may be designed to make multiple copies of the same part, or different parts, rather than just one part as in FIG. 4. In general, and for purposes of this specification, the phrase "cavity stack components" means any component parts used to construct a mold cavity stack assembly 410.

FIGS. 5a–c illustrate a simplified, cross-sectional diagram of an exemplary cavity stack component after progressive stages of maching. The component resembles the A side of the cavity stack assembly 410a pictured in FIG. 4. FIG. 5a simply depicts a raw workpiece 320, which may be a block or piece of metal or other suitable material. FIG. 5b shows workpiece 320 with a cavity 318 that has been milled, drilled or otherwise carved into its surface with a machine. FIG. 5c shows workpiece 320 after an additional feature 514 has been machined into its surface. Typically, cavity 318 and additional feature 514 may be added to workpiece 320 by two different machines, in two different stages. Although the machining of workpieces is often far more complex than the process depicted in FIG. 5, that figure depicts the general process by which a mold cavity stack component is typically constructed—i.e., drilling, carving, sanding or otherwise configuring a raw workpiece, in a step-wise fashion, to render a finished cavity stack component.

Figure 1:
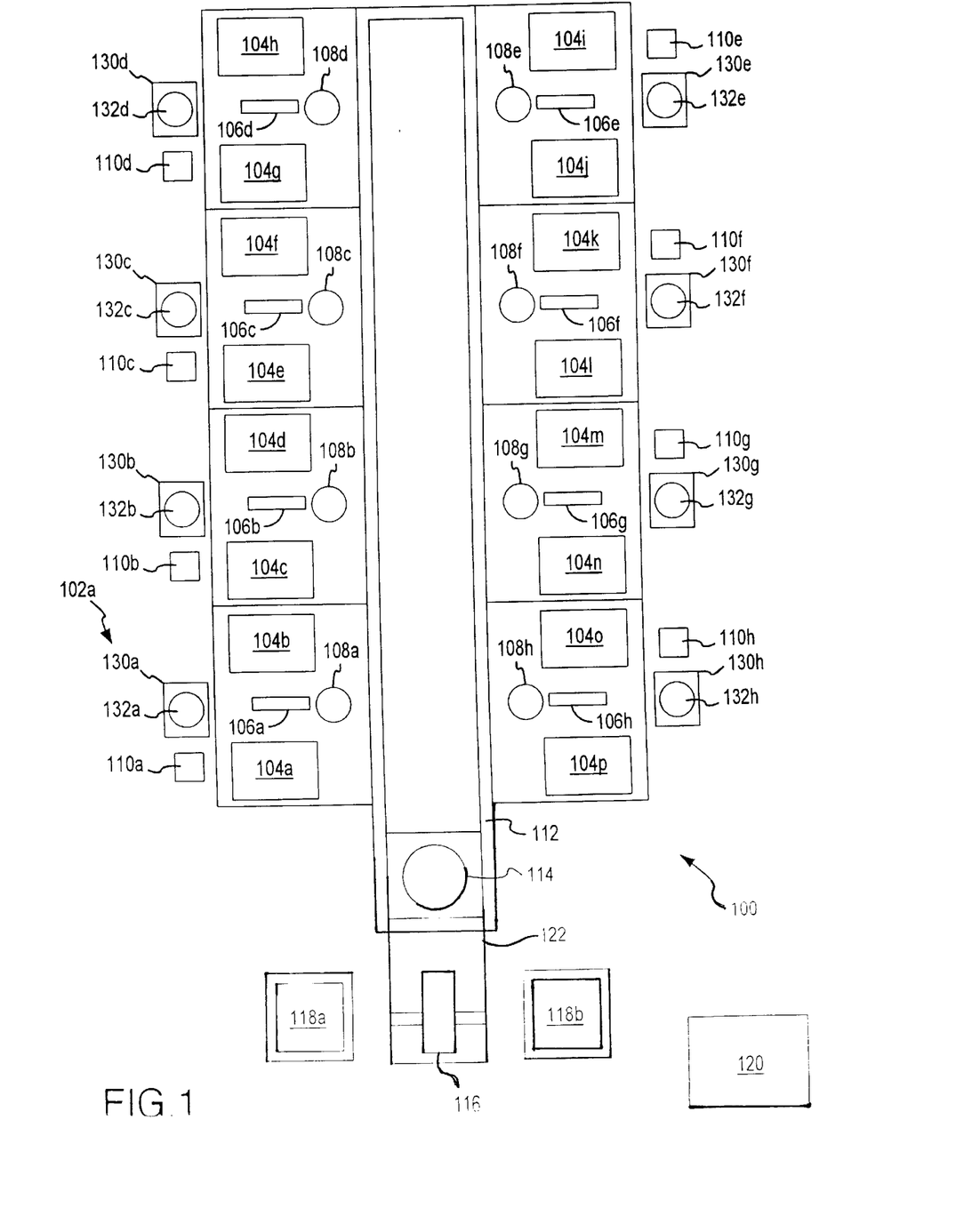
FIG. 1 is a conceptual block diagram depicting a system for manufacturing plastic injection mold cavity components in accordance with one exemplary embodiment of the present invention.

A system for manufacturing plastic injection mold cavity components in accordance with one exemplary embodiment of the present invention includes a "supercell." As depicted in FIG. 1, a supercell 100 comprises an integrated manufacturing system, which may be used for manufacturing any number of items, including but not limited to mold cavity stack components for use in plastic injection molding or similar components for use in compression molding, vacuum forming, casting, extrusion, rotational molding, blow molding, injection stretch-blow molding and the like. Although FIG. 1 depicts only one supercell 100, it should be understood that two or more supercells 100 may also be integrated.

Figure 2:
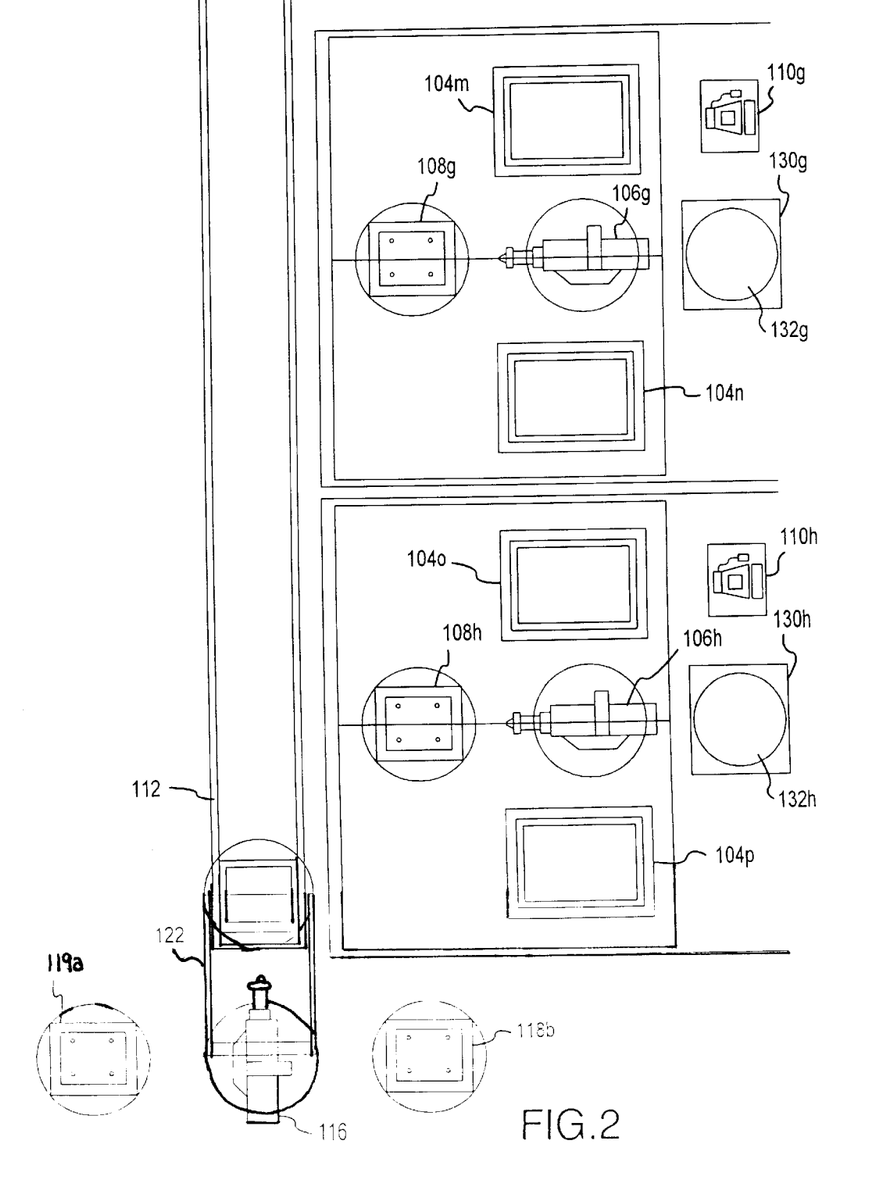
FIG. 2 is a magnified view of a section of FIG. 1.

Generally, supercell 100 is comprised of at least two "subcells" 102 As depicted in FIG. 1, supercell 100 comprises eight subcells 102; alternatively, supercell 100 may comprise two subcells 102, five subcells 102, sixteen subcells 102 or any other suitable number of subcells 102. (FIG. 2 is a magnified view of a portion of supercell 100 similar to that pictured in FIG. 1.)

In contrast to prior art systems, and in accordance with one embodiment of the present invention, supercell 100 includes one or more components that can integrate multiple subcells 102, thus enhancing efficiency within a manufacturing facility. For example, as described in further detail below, two or more subcells 102 may be integrated by a master robot 116, a master control unit 120, a track 112 adjacent to multiple subcells 102 or any other suitable manner of integrating subcells 102.

In accordance with one embodiment of the present invention, each subcell 102 is generally comprised of a subcell cabinet 108, a subcell robot 106, two or more machines 104, a subcell control unit 110 and a subcell drop chamber 130. Subcell cabinet 108 may be any device suitably configured for holding or otherwise containing workpieces and/or electrodes Subcell cabinet 108 may be a shelf a series of vertically stacked shelves, several independent (e.g., distributed) shelving units, a cylinder with one or more shelves along its circumference, a cube-shaped shelving unit, or a device having any other suitable configuration for holding workpieces and/or electrodes. Additionally, subcell cabinet 108 may move or may be stationary. For example, subcell cabinet 108 may turn on a central axis or may move vertically up and down to move workpieces and/or electrodes into advantageous positions.

Machines 104 carry out steps in the manufacturing process of both cavity stack components and electrodes. For example, machines 104 may include, but are not limited to, machining centers, turning centers, various grinders, wire-cut EDMs, die-sinking EDMs or any other suitable machines 104 for machining cavity stack components and/or electrodes. Such machines 104 are provided by companies such as Mitsubishi, Charmilles, Nakamura, System 3R, Okamoto and the like and are well known and readily available to those skilled in the art. Some examples of machines 104 suitable for machining workpieces include, but are not limited to, Nakamura's Nakamura-Tome SC-150 (a 5-axis lathe), Charmilles' Robofil2030SI Wire EDM, Mitsubishi's EDM Drill ST300, Matsuura's MC-510VG CNC Machining Center, and Okamato's Grind-X Surface Grinder.

Other machines 104, also well known to those skilled in the art, may perform measuring functions. For example, machines 104 may be configured to measure particular workpieces to verify their uniformity and/or their conformity to a particular design. If such a measuring machine 104 measures an imperfection or inconsistency in a workpiece, it may be configured to adjust the operation of one or more other machines to improve the machining of that particular type of workpiece. A given subcell 102 may include two or more different machines 104, two or more of the same machine 104 or any other combination or configuration of machines 104.

Subcell robot 106 may be any suitable robot or other similar mechanized apparatus for transferring workpieces and/or electrodes between subcell cabinet 108 and one or more machines 104 within a subcell 102. For example, subcell robot 106 may be a six-axis robot or may have more or fewer axes, depending on the needs of the manufacturing process within subcell 102. For example, System 3R's (Stockholm, Sweden) Workmaster robot is one type of six-axis robot which may be included in a subcell 102. In accordance with one aspect of the invention, subcell robot 106 is located proximate subcell cabinet 108 and one or more machines 104 so that subcell robot 106 may transfer workpieces and/or electrodes from subcell cabinet 108 to one or more machines 104, from one machine 104 to another machine 104 within subcell 102, and from machines 104 to subcell cabinet 108. For example, subcell robot 106 may retrieve a workpiece from subcell cabinet 108 and load the workpiece onto a machine 104. After machine 104 has machined a feature into the workpiece, subcell robot 106 may retrieve the workpiece from machine 104 and load it either onto another machine 104 in that subcell 102 or onto subcell cabinet 108.

In accordance with another aspect of the present invention, subcell control unit 110 for each subcell 102 may be any suitable computerized system for controlling and/or monitoring the activities of subcell robot 106 and machines 104 in that subcell 102. (Subcell control unit 110 may also control and/or monitor subcell cabinet 108 if necessary, for example if subcell cabinet 108 moves) Subcell control unit 110 may be any computer system (e.g., a personal desktop computer), including computer hardware, software, a server, a network and the like. In accordance with one aspect of the invention, subcell control unit 110, subcell 106 and machines 104 in a particular subcell 10? are configured to communicate electronically with one another This may be accomplished in part via currently available software systems, such as System 3R's WorkManager software system, which may be used by subcell control unit 110. In one embodiment, subcell control unit 110 includes a video monitor, so that a worker can monitor the status of components and electrodes in subcell 102. In another embodiment, subcell control unit 110 includes a keyboard, keypad or other information input device for entering information by a worker.

In accordance with yet another aspect of the invention, subcell 102 may include a subcell drop chamber 130. Subcell drop chamber 130 may be any area or structure configured to allow placement of one or more workpieces to be retrieved by subcell robot 106. In one embodiment, subcell drop chamber 130 may be a small enclosure, adjacent to subcell robot 106, which contains a drop chamber cabinet 132. During a time when workpieces and/or electrodes are not being manufactured in subcell 102, a worker may access drop chamber 130, place workpieces and/or electrodes in drop chamber cabinet 132, and use subcell control unit 110 to instruct subcell robot 106 and one or more machines 104 to pick up, transfer and machine those workpieces and/or electrodes. Subcell drop chamber 130 is configured to allow one or more workers to use subcell robot 106 and machines 104 in one subcell 102 without disrupting operations of any other subcell 102 within supercell 100. It will be understood that drop chamber 130 need not be an actual room or "chamber," but may also be an area adjacent to subcell 102, a stand-alone drop chamber cabinet 132 or any other configuration which allows a worker or other person to input workpieces and/or electrodes into subcell 102. This may be useful, for example, if a worker wants to verify the correct operation of a given machine 104 or subcell robot 106 or needs to use one machine 104 in a subcell 102 for a particular machining purpose, without disrupting the automated operation of other machines 104 in the subcell 102 or the operation of the supercell 100 as a whole.

In accordance with one embodiment of the present invention, two or more subcells 102 are integrated into a supercell 100 Supercell 100 may integrate subcells 102 via one or more of various elements of supercell 100 For example, subcells 102 may be integrated by a track 112 located adjacent to subcells 102, a master robot 116, a master cabinet 114, a master control unit 120, a workpiece/electrode identification system (described in further detail below) or any other component of supercell 100 suitable for integrating two or more subcells 102. With reference to FIG. 1, one embodiment of supercell 100 includes eight subcells 102, a track 112, a master cabinet 114, a master robot 116, two staging cabinets 118 and a master control unit 120. It should be understood that different combinations and configurations of these components may be included in supercell 100 to achieve similar results in manufacturing efficiency.

According to one aspect of the invention, with reference to FIG. 1, one component of supercell 100 is master robot 116. Master robot 116 may be any suitable robot or machine for transferring workpieces and/or electrodes. For example, master robot 116 may be a six-axis robot, such as those offered by FANUC Robotics, Rochester Hills, Mich. In the embodiment depicted by FIG. 1, for example, master robot 116 may move along track 112. Alternatively, in another embodiment, master robot 116 may be placed such that it is simultaneously adjacent to multiple subcells 102 and, therefore, does not move along a track. Master robot 116 may comprise any mechanized means for transferring workpieces and/or electrodes from one location or cabinet to another either now in existence or hereafter discovered.

In one embodiment, master robot 116 may be coupled with master cabinet 114, for example, as in FIG. 1, by a suitable coupling mechanism 122. Master cabinet 114 may have any suitable configuration for holding or otherwise containing workpieces and/or electrodes. For example, rather than being coupled to master robot 116, master cabinet 114 may be an independent, stand-alone component of supercell 100 Alternatively, master cabinet 114 may comprise multiple cabinets, located throughout supercell 100. As described above in relation to subcell cabinets 108, master cabinet 114 may have any size and shape suitable for holding workpieces and/or electrodes. Further, master cabinet 114 may be stationary, may move from one location to another, may move at one location (for example, may pivot or move up and down vertically), may be scalable to larger or smaller sizes, and the like.

In the embodiment depicted in FIG. 1, coupled master robot 116 and master cabinet 114 move along track 112, which extends between multiple subcells 102. Track 112 may be a physical track, such as a train-like track or monorail, and may be located on a floor, in a trench, suspended from the ceiling or configured in any suitable way to physically steer master robot 116 and master cabinet 114. Alternatively, track 112 may simply be a path that master robot 116 travels. For example, a global positioning system may be incorporated into master robot 116 and/or master cabinet 114, as well as subcells 102, which may allow master control unit 120 to guide master robot 116 and master cabinet 114 to appropriate subcells 102 at appropriate times based on global positioning information. Therefore, "track" 112, for purposes of this specification, may comprise any path taken by master robot 116, with or without master cabinet 114. As described above, master cabinet 114 may also be stationary and disconnected from master robot 116, rather than mobile and connected to master robot 116.

Supercell 100 may further comprise at least one staging cabinet 118, configured for storing inventory of raw and/or completed workpieces and electrodes. Staging cabinet 118 is any suitable storage device, such as a multi-sided shelving unit, for holding mold components and electrodes. FIG. 1 includes two staging cabinets 118, but supercell 100 may include only one staging cabinet 118, many staging cabinets 118 or as many as are suitable for a given supercell 100 Staging cabinets 118 may be loaded manually, by any worker, and may be based on any inventory, for example of mold cavity components and electrodes to be produced in a given mold manufacturing cycle.

In accordance with another aspect of the invention, supercell 100 may be integrated by a master control unit 120. Master control unit 120 may comprise any computerized system configured to wholly or partially control, integrate and/or monitor the operation of two or more subcells 102. Master control unit 120 may comprise any computerized system, including computer hardware, such as one or more input devices, such as keyboards or keypads, one or more monitors, one or more data storage devices and the like; computer software; one or more servers; and/or one or more network connections. Any other computerized components either now known or hereafter discovered may be used as part of master control unit 120 to wholly or partially control, integrate and/or monitor one or more subcells 102.

Master control unit 120 may integrate components of supercell 100 by controlling master robot 116, two or more subcell computers 110, subcell robots 106 or machines 104, or any combination thereof. In another embodiment master control unit 120 may integrate components of supercell 100 by any of the means above and/or by controlling the movement of workpieces throughout supercell 100. For example, in accordance with one embodiment of the present invention, depicted in FIG. 3, each workpiece 320 and electrode 310 is mounted to a pallet 312. (In one embodiment, electrodes 310 may be mounted to pallets 312 via holders 316, workpieces 320 and raw electrode may be mounted to pallets 312 via adaptor plates 322, or both.)

Figure 3:
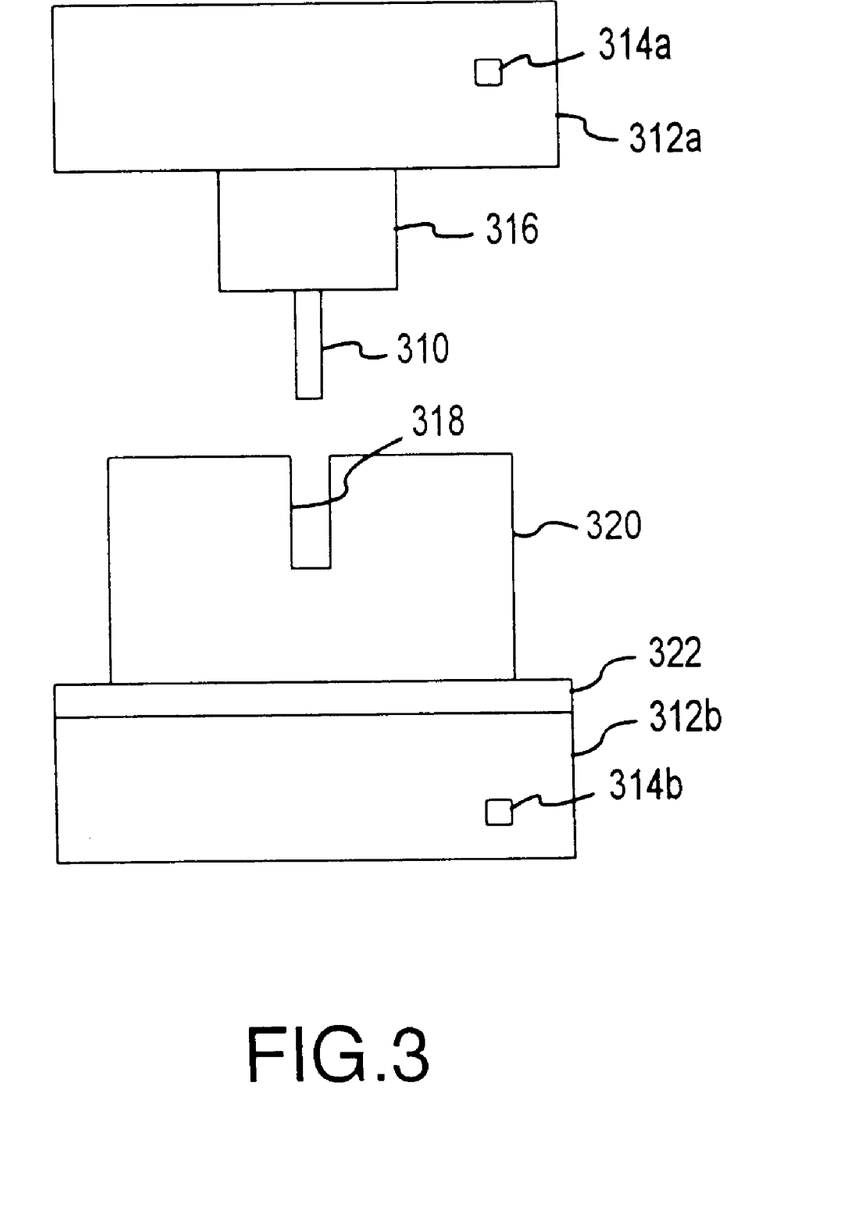
FIG. 3 is a conceptual diagram of an EDM apparatus.

Pallets 312 may be handled and/or transported and/or transferred by master robot 116 and/or subcell robot 106 and may be mounted to any released from one or more machines 104 (see FIG. 1) so that electrodes 310 and workpieces 320 may be machined. In accordance with one aspect of the invention, pallets 12 may be configured such that each pallet 312 has a uniform overall shape. Thus, each pallet 312 may fit onto machines and robots in the same way, providing uniformity and ease of handling.

Pallets 312 may be identified by master robot 116, subcell robot 106 machines 104, subcell control unit 110 and/or master control unit 120 by identifying indicia 314 attached to each pallet 312. Identifying indicia 314 may be a computer chip, a bar code or other optical code, a light-emitting device or any other suitable means for identifying pallet 312 with its attached electrode 310 or workpiece 320. In one embodiment of the present invention including identifying indicia 314, at least one component of supercell 100 may be configured to read or otherwise recognize identifying indicia 314. For example, master robot 116 may include a bar code reader, if identifying indicia 314 are bar codes.

It is understood that pallets 312 may often be subjected to high-speed rotation during machining of workpiece 320 or electrode 310 and, thus, compensation in the structure of pallets 312 may be made for any weight added to pallets 312 by identifying indicia 314. Tools other than electrodes 310, such as drills and machining centers, may be connected or mounted to machines 104 via a spindle, or other mounting device, rather than pallet 312. In that case, the spindle or other device may also contain identifying indicia 314, for identification within supercell 100.

With reference now to FIG. 1 and according to one embodiment of the invention, a method for using supercell 100 to produce plastic injection mold cavity stack components for one cavity stack includes first loading raw workpieces and/or electrodes onto staging cabinets 118 This may be accomplished either manually, via machine or both, or by any other suitable means for loading workpieces and electrodes onto staging cabinets 118.

In one embodiment of the present invention, workpieces and electrodes may be chosen from a list, or "library," of standard workpieces and electrodes In another embodiment, guidelines man be set forth defining the choices of workpieces and electrodes available to construct a given mold cavity stack. Libraries and/or guidelines may be devised by mold designers, master mold makers and other members of a manufacturing team, based, for example, on workpieces and electrodes that are used recurrently in mold cavity stack production. These libraries and guidelines may be updated or changed according to the experience of a manufacturing team. By standardizing the list of workpieces and electrodes available for use in cavity stack production, the work of the master mold maker is reduced. Thus, less time is required at the beginning of the mold making process and minimal postproduction design adjustments are required after the manufacturing process has started. This standardization can be used at one or multiple production sites to enhance the uniformity of the manufacturing process, allowing multiple production sites to more easily produce identical, interchangeable, plastic injection mold cavity components and, plastic parts.

When staging cabinets 118 are loaded (or as they are being loaded) with workpieces and electrodes for making the cavity stack components, master robot 116 retrieves workpieces and electrodes from staging cabinets 118 and loads them onto master cabinet 114, according to instructions transmitted to master robot 116 by master control unit 120. Master robot 116 and/or master control unit 120 may identify workpieces and electrodes by identification indicia 314 attached to pallets 312 upon which those workpieces and electrodes are mounted. Information about identification indicia 314, workpieces, electrodes cavity stack component design specifications and the like may be input into master control unit 120 before and/or during the cavity stack production process. Alternatively, master cabinet 114 may be manually loaded with workpieces and/or electrodes from staging cabinets 118.

When master cabinet 114 is loaded with workpieces and electrodes for the cavity stack, master control unit 120 instructs master robot 116 with its attached master cabinet 114, in the embodiment of FIG. 1) to move along track 112 to a position adjacent to one of subcells 102. Again under instructions from master control unit 120, master robot 116 retrieves workpieces and/or electrodes from master cabinet 114 and places them into subcell cabinet 108. Master robot 116 may perform this transfer function multiple times, for example until master control unit 120 informs master robot 116 that subcell cabinet 108 has been loaded with all workpieces and/or electrodes for a given manufacturing cycle. Alternatively, master robot 116 may be instructed to partially load one subcell cabinet 108, move to another subcell 102, partially load that subcell cabinet 108, move to another subcell 102, etc.

When at least one component or electrode has been loaded onto at least one subcell cabinet 108, subcell robot 106, under control of subcell control unit 110, retrieves a workpiece or electrode from subcell cabinet 108 and places the workpiece or electrode onto one of the machines 104 in subcell 102. Again, subcell robots 106, machines 104 and/or subcell control units 110 may identify workpieces and electrodes by identification indicia 314 attached to pallets 312 on which the workpieces and electrodes are mounted. Information about identification indicia 314, workpieces, electrodes, instructions for subcell robot 106, design specifications and the like may be input directly into subcell control unit 110 by a member of the manufacturing team or may be input through master control unit 120, or both After a workpiece or electrode is placed or mounted on machine 104, one or more features is then machined into the workpiece or electrode. When work instructions for a workpiece or electrode have been completed, subcell robot 106, also under instructions from subcell control unit 110, retrieves the workpiece or electrode and places it back on subcell cabinet 108 Alternatively, under different instructions from subcell control unit 110 subcell robot 106 may retrieve the workpiece or electrode from one machine 104 and place it onto another machine 104 in subcell 102, for further machining Workpieces and/or electrodes which have been machined by one or more machines 104 in one subcell 102 and placed back on subcell cabinet 108 by subcell robot 106 may be retrieved by master robot 116. Master robot 116 may then load one or more workpieces onto master cabinet 114 and travel along track 112 to another subcell 102 to transfer the workpieces and/or electrodes to the new subcell 102 for further machining. Alternatively, master robot 116 may travel back to its original position adjacent to staging cabinets 118 and transfer workpieces and/or electrodes to staging cabinets 118. For example, when workpieces and electrodes for the cavity stack components have been completely machined, master robot 116 may transfer them to staging cabinets 118. This may be accomplished at the end of a manufacturing cycle, such as when a cavity stack is completely manufactured, or may be accomplished during the cycle, so that components are placed back on staging cabinets 118 as they are completed.

In accordance with another aspect of the invention, rather than manufacturing cavity stack components for one cavity stack at a time, as described in the embodiment above, supercell 100 may run at a steady state of operation in which cavity stack components for multiple cavity stacks are being produced simultaneously. In such a steady state, supercell 100 operates in much the same way that was described above. Master robot 116 may move from one subcell 102a to another 102f to another 102c, in an order determined by master control unit 120, to deposit and retrieve workpieces and electrodes into and out of various subcells 102. Master control unit 120 may be used to monitor and instruct various components of supercell 100, such as master robot 116 and subcell control units 110, so that components work together, in an integrated fashion to produce cavity stack components for multiple cavity stacks.

In accordance with yet another aspect of the invention, supercell 100 may also be configured to permit occasional human intervention into the operation of one subcell 102, without disrupting the operation of other subcells 102. For example, subcell 102 may contain a sensor (not shown in FIG. 1), configured to generate an interrupt signal upon detecting access to subcell cabinet 108 other than by subcell robot 106 or master robot 116. Such an interrupt signal may stop work in that subcell 102, allowing a human operator to input instructions into subcell control unit 110 to operated subcell 102. To allow such a human operator to input instructions, subcell control unit 110 may require the operator to input a security code or identification code.

In another embodiment, subcell 102 may include a drop chamber 130. Drop chamber 130 may include a drop chamber cabinet 132, in which a human operator may place one or more workpieces or electrodes. Drop chamber 130 may include a sensor, similar to that described above, for generating an interrupt signal to stop work in that subcell 102. Alternatively, a human operator may stop work in subcell 102 (or in part of subcell 102) by inputting instructions into subcell control unit 110.

Either of the above-described embodiments for an "interrupt system" for subcell 102 allows a human operator to enter subcell 102 and make adjustments one or more components of subcell 102, such as subcell control unit 110. This may be desirable, for example, if a master mold maker or other human operator notices that a cavity stack component has a characteristic (e.g., an imperfection or defect) which may be caused by one or more machines 104. In that example, the human operator may access subcell cabinet 108 or drop chamber 130, interrupt work in that subcell 102, place a "test" workpiece or electrode in subcell cabinet 108 or drop chamber cabinet 132, allow that test workpiece to be machined, observe the results and make any desired adjustments to machines 104 or other components of subcell 102. According to one embodiment of the present invention, sensors, interrupt signals, drop chambers 130, subcell control units 110 and master control unit 120 would be configured and programmed such that an authorized human operator may enter one or more drop chambers 130 or subcell cabinets 108 and make adjustments to one or more subcell control units 110, while work continues on an automated basis in all remaining subcells 102. Thus, supercell 100 continues to operate even when work is interrupted in one or more subcells 102.

As described in the embodiments above, supercell 100 includes several components which may, together or independently, integrate two or more subcells 102. For example, master control unit 120 may integrate multiple subcells 120 by controlling and monitoring master robot 116, subcell robots 106, subcell control units 110 and/or other components of supercell 100 Similarly, master robot 116 may integrate two or more subcells 102 by delivering and retrieving workpieces and electrodes from those subcells 102. Track 112 may also integrate two or more subcells 102 by connecting or providing a path for master robot 116 between those subcells 102. Integrating indicia 314 on pallets 312 for workpieces and/or electrodes may integrate two or more subcells 102 by providing means for components of those subcells 102, and of supercell 100 as a whole, to identify and monitor the progress of as workpieces and electrodes. These are but a few examples of components of supercell 100 which may integrate two or more subcells 102 for making mold cavity stack components, as described in the various aspects and embodiments above.

Lastly, as mentioned above, various principles of the invention have been described only as illustrative embodiments, and many combinations and modifications of the above-described structures, arrangements, proportions, elements, materials and components may be used in the practice of the invention For example, methods and apparatuses not specifically described may be varied and particularly adapted for a specific environment and operating requirement without departing from those principles These and other modifications in the design and arrangement of the various components, processes, steps and descriptions thereof

I claim:

1. A system for manufacturing plastic injection mold cavity components, comprising:

A first subcell, including:
  a first cabinet for retrievably storing a plurality of first electrodes and a first one of said components associated with a first mold cavity;
  a first machine configured to releasably mount one of said first electrodes; and
  a first subcell robot configured to retrieve said first component from said first cabinet and to mount said first component to said first machine, and to retrieve said first electrodes from said first cabinet and to transfer said first electrodes, serially, to said first machine;

a second subcell, including:
  a second cabinet for retrievably storing a plurality of second electrodes and a second one of said components associated with a second mold cavity;

second machine configured to releasably mount one of said second electrodes relative to said second component such that said second component may be machined by said one of second electrodes; and a second subcell robot configured to retrieve said second component from said second cabinet and to mount said second component to said second machine, and to retrieve said second electrodes from said second cabinet and to transfer said second electrodes, serially, to said second machine;

a track positioned proximate said first and said second subcells;

a master cabinet configured to retrievably store said first component, said second component, said first electrodes, and said second electrodes; and a master robot configured to move along said track, said master robot being configured to selectively transfer said first component and said first electrodes between said master cabinet and said first cabinet when said master robot is positioned on said track proximate said first subcell, said master robot being further configured to selectively transfer said second component and second electrodes between said master cabinet and said second cabinet when said master robot is positioned on said track proximate said second subcell.

2. The system of claim 1, wherein said master cabinet is configured to move along said track.

3. The system of claim 1, wherein said master cabinet is configured to move along said track with said master robot.

4. The system of claim 1, wherein said track corresponds to the path traveled by said master robot.

5. The system of claim 4, further comprising a third and fourth subcell, and wherein said track extends linearly in the vicinity of said first, second, third and fourth subcells.

6. The system of claim 1, wherein said track comprises a rail for mechanically guiding said master robot.

7. The system of claim 1, where said track is suspended from above said master robot.

8. The system of claim 1, wherein said first machine comprises a wire EDM machine and one of said first electrodes comprises a wire electrode.

9. The system of claim 1, further comprising an inventory storage area from which at least one of said first electrodes, said second electrodes, said first component, and said second component are loaded on to said master cabinet.

10. The system of claim 1, wherein said first electrodes and said second electrodes are mounted to a pallet, and wherein said first machine and said second machine are configured to releasably mount each of said pallets.

11. The system of claim 1, wherein each of said first and second electrodes has associated therewith identifying indicia, and further wherein said master robot is equipped with a master reader configured to read each of said identifying indicia.

12. The system of claim 11, wherein each of said identifying indicia is embodied in a memory chip.

13. The system of claim 11, wherein each of said identifying indicia is embodied in a bar code display.

14. The system of claim 1, further comprising a server configured to run a master application which controls the transfer by said master robot of said first and second electrodes between said master cabinet and each of said first and said second cabinets.

15. The system of claim 14, wherein:

said first robot is configured to communicate electronically with said first machine in accordance with a first software application;

said second robot is configured to communicate electronically with said second machine in accordance with a second software application.

16. The system of claim 15, further comprising:

a first sensor configured to generate a first interrupt signal upon detecting access to said first cabinet other than by said first robot or said master robot;

a second sensor configured to generate a second interrupt signal upon detecting access to said second cabinet other than by said second robot or said master robot, and said system is configured to terminate said first application in response to said first interrupt signal, and to terminate said second application in response to said second interrupt signal.

17. The system of claim 16, further comprising an input terminal configured to permit a human operator to override at least one of said first and said second interrupt signals upon entry into said input terminal of an override security code.

18. The system of claim 15, wherein said master application, said first application, and said second application are configured to complete all machining operations on said first component and said second component without operator intervention.

19. The system of claim 1, further comprising third and fourth subcells, and wherein:

said track is disposed such that, at a first position, said master robot and said master cabinet are disposed proximate said first and said second subcells, and said master robot and said master cabinet are disposed proximate said third and fourth subcells at a second position.

20. The system of claim 1, further comprising a display monitor configured to display, in response to a request made at an input terminal, the location of any of said first component said second component, said first electrodes, and said second electrodes.

21. A method for machining mold cavity workpieces for use in manufacturing plastic parts in a plastic injection mold machine, comprising the steps of:

loading, into a master cabinet, a first workpiece for use in a first mold cavity, a second workpiece for use in a second mold cavity, a first electrode for use in machining said first workpiece, and a second electrode for use in machining said second workpiece;

retrieving, by a master robot, said first and second workpieces and said first and second electrodes from said master cabinet;

guiding said master robot along a track and positioning said master robot proximate a first subcell;

while said master robot is proximate said first subcell, loading, by said master robot, said first workpiece and said first electrode into a first cabinet associated with said first subcell;

guiding said master robot along said track and positioning said master robot proximate a second subcell;

while said master robot is proximate said second subcell loading, by said master robot, said second workpiece and said second electrode into a second cabinet associated with said second subcell;

transferring, by a first robot associated with said first subcell, said first workpiece and said first electrode to a first machine associated with said first subcell; and transferring, by a second robot associated with said second subcell, said second workpiece and said second electrode to a second machine associated with said second subcell.

22. The method of claim 21, further comprising the steps of:
   machining, using said first machine, said first workpiece by said first electrode;
   machining, using said second machine, said second workpiece by said second electrode;
   transferring, by said first robot, said machined first workpiece from said first machine to said first cabinet;
   transferring, by said second robot, said machined second workpiece from said second machine to said second cabinet;
   transferring, by said master robot, said first machined workpiece from said first cabinet to said master cabinet;
   transferring, by said master robot, said second machined workpiece from said second cabinet to said master cabinet.

23. The method of claim 22, further comprising the step of transferring said first machined workpiece from said master cabinet to said second cabinet.

24. The method of claim 22, wherein said step of loading into said master cabinet comprises the steps of:
   manually loading said first and second workpieces into an inventory storage facility; and
   retrieving, by said master robot said first and second workpieces from said inventory storage facility.

25. The method of claim 24, further comprising the steps of:
   transferring said first machined workpiece and said second machined workpiece to said inventory storage facility.

26. The method of claim 22, further comprising the steps of:
   monitoring a first subcell, and generating a first interrupt signal upon detecting manual access to a secure area of said first subcell.

27. The method of claim 26, further comprising the steps of terminating the machining of said first workpiece at said first machine in response to said first interrupt signal.

28. The method of claim 26, further comprising the steps of:
   providing an input terminal;
   terminating the machining of said first workpiece at said first machine in response to said first interrupt signal if an override code is not manually entered into said input terminal substantially contemporaneously with said detection of manual access; and
   overriding said first interrupt signal and continuing the machining of said first workpiece upon generation of said first interrupt signal if said override code is entered into said input terminal substantially contemporaneously with said detection of manual access.

29. The method of claim 22, further comprising the steps of:
   assembling said first machined workpiece into said first mold cavity, and thereafter installing said first assembled mold cavity onto a plastic injection molding machine; and
   injecting plastic into said first mold cavity to thereby produce an injection molded plastic part.

30. The method of claim 21, wherein said steps of guiding said master robot along said track comprise guiding said master cabinet along said track with said master robot.

31. A system for manufacturing plastic injection mold cavity components, comprising:
   A first subcell, including:
      a first cabinet for retrievably storing a plurality of first electrodes and a first one of said components associated with a first mold cavity;
      a first machine configured to releasably mount one of said first electrodes; and
      a first subcell robot configured to retrieve said first component from said first cabinet and to mount said first component to said first machine, and to retrieve said first electrodes from said first cabinet and to transfer said first electrodes, serially, to said first machine;
   a second subcell, including:
      a second cabinet for retrievably storing a plurality of second electrodes and a second one of said components associated with a second mold cavity;
      a second machine configured to releasably mount one of said second electrodes relative to said second component such that said second component may be machined by said one of second electrodes; and
      a second subcell robot configured to retrieve said second component from said second cabinet and to mount said second component to said second machine, and to retrieve said second electrodes from said second cabinet and to transfer said second electrodes, serially, to said second machine;
   a track positioned proximate said first and said second subcells;
   a master cabinet configured to retrievably store said first component, said second component, said first electrodes, and said second electrodes;
   a master robot configured to move along said track, said master robot being configured to selectively transfer said first component and said first electrodes between said master cabinet and said first cabinet when said master robot is positioned on said track proximate said first subcell, said master robot being further configured to selectively transfer said second component and second electrodes between said master cabinet and said second cabinet when said master robot is positioned on said track proximate said second subcell; and
   a master control unit configured to monitor and control the operation of said master robot.

32. The system of claim 31, wherein said master control unit comprises a computer software system.

33. The system of claim 31, wherein said master control unit comprises a computerized server system.

34. The system of claim 31, wherein said first subcell further comprises a first subcell control unit, configured to control said first subcell robot and said first machine, and said second subcell further comprises a second subcell control unit, configured to control said second subcell robot and said second machine.

35. The system of claim 34, wherein said first subcell control unit and said second subcell control unit are comprised of computer software systems.

36. The system of claim 34, wherein said first subcell control unit and said second subcell control unit are comprised of computerized server systems.

37. The system of claim 34, wherein said master control unit is further comprised to monitor and control said first and second subcell control units.

* * * * *